United States Patent
Kim et al.

(10) Patent No.: US 8,318,366 B2
(45) Date of Patent: Nov. 27, 2012

(54) HYDROGEN GENERATOR AND FUEL CELL USING THE SAME

(75) Inventors: Jin-ho Kim, Yongin-si (KR); Jae-yong Lee, Yongin-si (KR); Yeong-suk Choi, Yongin-si (KR); Kyoung-hwan Choi, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 651 days.

(21) Appl. No.: 12/171,404

(22) Filed: Jul. 11, 2008

(65) Prior Publication Data

US 2009/0110975 A1    Apr. 30, 2009

(30) Foreign Application Priority Data

Oct. 31, 2007    (KR) .................. 10-2007-0110255

(51) Int. Cl.
*H01M 8/06*    (2006.01)
*B01J 7/00*    (2006.01)

(52) U.S. Cl. .......................... 429/416; 48/61

(58) Field of Classification Search ............. 429/411; 422/129; 423/648.1; C25B 1/04, 11/02, C25B 15/02; C01B 3/04
See application file for complete search history.

(56) References Cited

U.S. PATENT DOCUMENTS

2005/0238573 A1* 10/2005 Zhang et al. ........... 423/648.1

FOREIGN PATENT DOCUMENTS

| JP | 2002-80201 | 3/2002 |
| JP | 2004059977 A * | 2/2004 |
| KR | 2005-93607 | 9/2005 |
| WO | WO 2005/090229 | 9/2005 |
| WO | WO 2005090229 A1 * | 9/2005 |

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A hydrogen generator and a fuel cell using the same includes: a first container containing an aqueous solution of alkaline metal carbonate or bicarbonate; a second container containing a metal hydride; and a supply unit disposed between the first container and the second container. The hydrogen generator has a high hydrogen generating rate, can provide a fuel cell with a high energy density, and the amount of hydrogen generated thereby is easy to control.

16 Claims, 3 Drawing Sheets

HYDROGEN GENERATOR AND FUEL CELL USING THE SAME

CROSS-REFERENCE TO RELATED APPLICATION

This application claims the benefit of Korean Application No. 2007-110255, filed Oct. 31, 2007, in the Korean Intellectual Property Office, the disclosure of which is incorporated herein by reference.

BACKGROUND OF THE INVENTION

1. Field of the Invention

Aspects of the present invention relate to a hydrogen generator and a fuel cell using the same, and more particularly, to a hydrogen generator capable of achieving a high energy density and having a controllable hydrogen generating rate, and a fuel cell using the same.

2. Description of the Related Art

Fuel cells obtain electromotive force by a cell reaction which generates water from hydrogen and oxygen. Fuel cells can operate continuously insofar as fuel and oxidant are continuously supplied to the fuel cell.

A fuel cell is typically formed of an anode, a cathode, and an electrolyte disposed between the anode and the cathode. The anode and the cathode generally include a catalyst which facilitates an oxidation reaction and a reduction reaction which generate electricity. A polymer electrolyte membrane fuel cell (PEMFC), as an example of the fuel cell, is known to have a proton exchange membrane.

The PEMFC supplies hydrogen and oxygen from an external supply source to the fuel cell. Then, once hydrogen flows into the anode side of the fuel cell, oxidation takes place, producing $H^+$ ions and electrons ($e^-$). The electrons ($e^-$) are transported to an external circuit through the anode and returns to the cathode side of the fuel cell. Oxygen flows into the cathode side of the fuel cell, where reduction takes place, producing oxygen atoms with negative charges. Two hydrogen ions each with a positive charge form a bond with a single oxygen atom with negative charges and two electrons which return to the cathode from the external circuit to form water molecules.

Typical supply sources of hydrogen are liquid hydrogen, compressed hydrogen gas, or hydrogen-rich gas from a natural gas reformer. However, it is difficult to guarantee the safety of these hydrogen supply sources due to a danger of hydrogen explosion. In addition, a "volume or weight vs. hydrogen storage capacity" ratio (or storage density) is very low due to a large weight and volume of a container to store the hydrogen and an accompanying apparatus.

As a result of attempts to develop a safe hydrogen supply source with high hydrogen storage density, methods of generating hydrogen using hydrolysis of metal hydrides, such as hydrolysis of sodium boron hydride ($NaBH_4$) are being used. Korean Patent Laid-Open Publication No. 2005-93607 discloses a method of generating hydrogen by contacting a stabilized $NaBH_4$ solution to a hydrogen-generating catalyst. In addition, Japanese Patent Laid-Open Publication No. 2002-80201 discloses a method of generating hydrogen by adding an acidic solution to an alkaline earth metal hydride.

SUMMARY OF THE INVENTION

Aspects of the present invention relate to a hydrogen generator and a fuel cell using the same, the hydrogen generator using an aqueous solution of alkaline metal carbonate or bicarbonate and a metal hydride.

According to an aspect of the present invention, a hydrogen generator and a fuel cell using the same, includes: a first container containing an aqueous solution of alkaline metal carbonate or bicarbonate; a second container containing a metal hydride; and a supply unit disposed between the first container and the second container to supply the aqueous solution to the metal hydride or vice versa.

According to another aspect of the present invention, the alkaline metal carbonate or bicarbonate may be at least one of sodium carbonate, potassium carbonate, sodium bicarbonate and potassium bicarbonate.

According to another aspect of the present invention, a content of the alkaline metal carbonate or bicarbonate within the aqueous solution may be greater than 0 wt % up to 30 wt % based on a weight of the aqueous solution.

According to another aspect of the present invention, the metal hydride may be at least one of alkaline metal boron hydride, alkaline metal aluminum hydride, alkaline metal hydride, and alkaline earth metal hydride.

According to another aspect of the present invention, the metal hydride may be sodium boron hydride ($NaBH_4$).

According to another aspect of the present invention, the aqueous solution of the first container includes at least one of sulfuric acid, nitric acid, hydrochloric acid, acetic acid, citric acid, and maleic acid.

According to another aspect of the present invention, the hydrogen generator may further include a third container containing an aqueous solution of at least one of sulfuric acid, nitric acid, hydrochloric acid, acetic acid, citric acid, and maleic acid.

According to another aspect of the present invention, the supply unit may supply the aqueous solution of the first container to the second container at a controlled rate.

According to another aspect of the present invention, the supply unit may supply the metal hydride of the second container to the first container at a controlled rate.

According to another aspect of the present invention, a fuel cell uses the hydrogen generator.

According to another aspect of the present invention, a method of generating hydrogen gas using a hydrogen generator for use in a fuel cell includes: supplying an aqueous solution of alkaline metal carbonate or bicarbonate via a first container of the hydrogen generator; supplying a metal hydride via a second container of the hydrogen generator; and combining the aqueous solution and the metal hydride to produce the hydrogen gas via a supply unit of the hydrogen generator.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
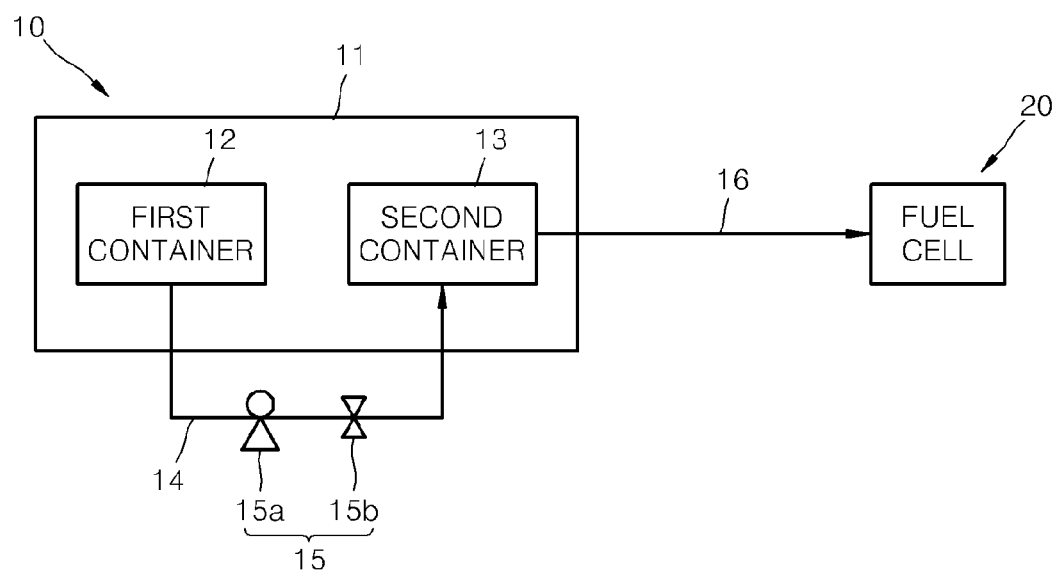
FIG. 1 is a schematic diagram of a hydrogen generator according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

Aspects of the present invention provide a hydrogen generator using an aqueous solution of alkaline metal carbonate or bicarbonate, and a metal hydride physically separated from the aqueous solution. Typically, metal hydrides, such as sodium boron hydride, react with water to produce hydrogen, as shown in the following Reaction Equation 1.

$$NaBH_4 + 2H_2O \rightarrow NaBO_2 + 4H_2 \qquad \text{Reaction Equation 1}$$

Moreover, in such a reaction between the metal hydride and water, the rate of hydrogen production generally increases as the pH decreases, which is represented by Correlation Equation 1.

$$\text{Log } t_{1/2} = pH - (a \times T - b), \qquad \text{Correlation Equation 1}$$

wherein $t_{1/2}$ is a half life of the degradation of the metal hydride, T is a reaction temperature, and a and b are constants.

In the reaction between the metal hydride and water, using an aqueous solution of alkaline metal carbonate or bicarbonate as a material for promoting generation of hydrogen, is surprisingly better at increasing the rate at which the metal hydride generates hydrogen than using an acidic solution. Consequently, the hydrogen generator according to an aspect of the present invention is capable of achieving a high energy density by contacting (or combining) the aqueous solution of alkaline metal carbonate or bicarbonate with the metal hydride that is initially physically separated from the aqueous solution. Meanwhile, the aqueous solution of alkaline metal carbonate or bicarbonate, which is generally used as a buffer solution, is much easier to handle and more environmentally friendly than acidic solutions.

In the hydrogen generator according to aspects of the present invention, alkaline metal carbonate, such as sodium carbonate ($Na_2CO_3$), potassium carbonate ($K_2CO_3$); and alkaline metal bicarbonate, such as sodium bicarbonate ($NaHCO_3$), and potassium bicarbonate ($KHCO_3$), may be used as the carbonate or the bicarbonate included in the aqueous solution. Preferably, though not required, sodium bicarbonate or potassium bicarbonate may be used.

In the hydrogen generator according to aspects of the present invention, the content of the alkaline metal carbonate or bicarbonate within the aqueous solution is not particularly limited insofar as the aqueous solution exists in a homogenous state, but may preferably be greater than 0 wt % up to 30 wt % based on a total weight of the aqueous solution.

In the hydrogen generator according to aspects of the present invention, the aqueous solution of the alkaline metal carbonate or bicarbonate may further include at least one of sulfuric acid, nitric acid, hydrochloric acid, acetic acid, citric acid, and maleic acid. Meanwhile, the solution including the acid may be stored in a separate container, and may be supplied to contact (or combined with) the metal hydride together with the alkaline metal carbonate or alkaline metal bicarbonate, if desired, thereby increasing the rate of hydrogen generation.

According to an aspect of the present invention, the metal hydride refers to a material for generating hydrogen by reacting with water, and includes complex metal hydrides. In the hydrogen generator according to an aspect of the present invention, examples of metal hydrides includes alkaline metal boron hydrides, such as lithium boron hydride ($LiBH_4$), sodium boron hydride ($NaBH_4$), or a potassium boron hydride ($KBH_4$); alkaline metal aluminum hydrides, such as lithium aluminum hydride ($LiAlH_4$), sodium aluminum hydride ($NaAlH_4$), or potassium aluminum hydride ($KAlH_4$); and alkaline earth metal hydrides, such as magnesium hydride ($MgH_2$), or calcium hydride ($CaH_2$). Among these, sodium boron hydride ($NaBH_4$) is preferable, but not required.

Figure 2:
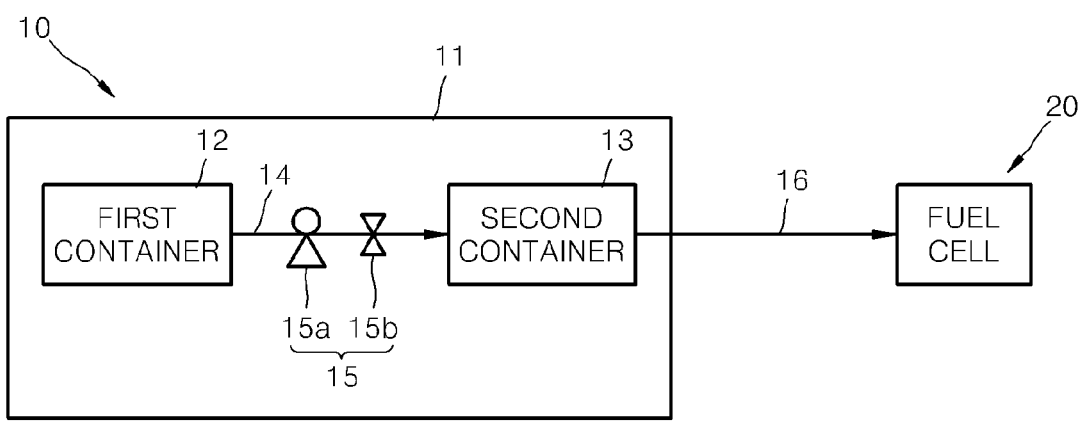
FIG. 2 is a schematic diagram of a hydrogen generator according to another aspect of the present invention.

FIG. 1 is a schematic diagram of a hydrogen generator according to an aspect of the present invention, and FIG. 2 is a schematic diagram of a hydrogen generator according to another aspect of the present invention. Referring to FIGS. 1 and 2, the hydrogen generator 10 includes a first container 12, a second container 13, and a supply unit 15 disposed between the first container 12 and a second container 13. In the hydrogen generator 10, an aqueous solution of alkaline metal carbonate or bicarbonate and the metal hydride are respectively stored in the first container 12 and the second container 13, and are thereby physically separated. When operating a fuel cell 20 which will be described later, the aqueous solution of the first container 12 can be supplied to the second container 13, to react with the metal hydride and thereby generate hydrogen.

Referring to FIGS. 1 and 2, the aqueous solution in the first container 12 is supplied to the second container 13 through a supply channel 14 by an operation of the supply unit 15. The supply unit 15 may include, for example, a pump 15a such as a metering pump. Moreover, the supply unit 15 may further include a check valve 15b. The rate of hydrogen generation can be controlled by controlling a rate of supply of the aqueous solution using the supply unit 15. Meanwhile, a third container (not shown) including an acidic solution, and a supply unit (not shown) disposed between the second container and the third container, may further be connected to the second container 13. Hydrogen produced by the reaction between the aqueous solution and the metal hydride in the second container 13 is supplied to the fuel cell 20 through a hydrogen channel 16.

A housing 11 receives (or contains) the first container 12 and the second container 13. The supply unit 15 may be disposed outside the housing 11 as shown in FIG. 1. Alternatively, as shown in FIG. 2, the supply unit 15 may be disposed inside the housing 11. In other aspects, the housing 11 may be omitted if necessary.

Figure 3:
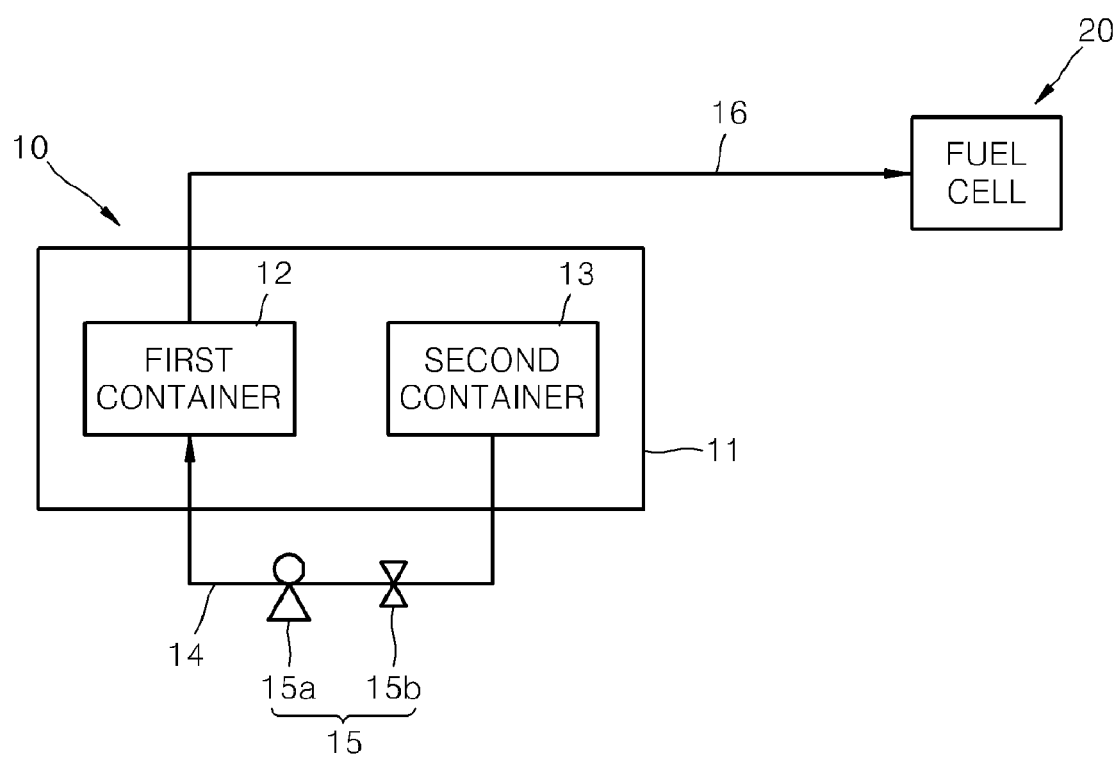
FIG. 3 is a schematic diagram of a hydrogen generator according to yet another aspect of the present invention.

FIG. 3 is a schematic diagram of a hydrogen generator according to another aspect of the present invention. The hydrogen generator 10 of FIG. 3 includes a first container 12 containing an aqueous solution of alkaline metal carbonate or bicarbonate, a second container 13 containing a metal hydride, and a supply unit 15 disposed between the first container 12 and the second container 13. The difference between the hydrogen generator 10 of FIG. 3 and the hydrogen generators 10 of FIGS. 1 and 2 is that, in the hydrogen generator 10 of FIG. 3, a solid-state metal hydride is supplied to a liquid-state aqueous solution, and as such, a supply unit 15 which is capable of transporting solid materials must be used. The metal hydride of the second container 13 is supplied to the first container 12 through a supply channel 14 by the operation of the supply unit 15. The supply unit 15 may include, for example, a pump 15a, such as a solid pump. Hydrogen produced by a reaction with the aqueous solution of alkaline metal carbonate or bicarbonate is supplied to a fuel cell 20 through a hydrogen channel 16.

The hydrogen generators according to aspects of the present invention may be used in various types of fuel cells, such as polymer electrolyte fuel cells, phosphate fuel cells, alkaline fuel cells, or a hydrogen engine. For example, a polymer electrolyte membrane fuel cell is typically formed of an anode, a cathode, and a membrane-electrode assembly (MEA) including a polymer electrolyte membrane disposed between the anode and the cathode, and the hydrogen produced from the hydrogen generator is oxidized into hydrogen ions by an anode catalyst.

Hereinafter, aspects of the present invention will be described in more detail with reference to the following examples. However, these examples are for illustrative purposes only and are not intended to limit the scope of the invention.

EXAMPLES

Example 1

Manufacture of Hydrogen Generator and Evaluation of Performance

A hydrogen generator cartridge was prepared according to an aspect of FIG. 1, and was completed by adding 10% sodium bicarbonate ($NaHCO_3$) solution to the first container, and then adding sodium boron hydride ($NaBH_4$) to the second container.

PtB catalyst and polyvinylidene fluoride (PVDF) was mixed with an adequate amount of solvent N-Methyl-2-pyrrolidone (NMP) to prepare a cathode-forming slurry. The cathode-forming slurry was coated on a carbon paper on which a microporous layer is coated using a bar coater, then a cathode was produced therefrom by a drying process. Separately, an anode was produced using the same method as for the cathode. For an electrolyte membrane between the cathode and the anode, nafion 112 was used to produce an electrode-membrane assembly (MEA) with a size of 10 $cm^2$. The hydrogen generator was connected to the anode side of the MEA, and a container containing desiccated air was connected to the cathode side connected to the MEA.

Next, a sodium bicarbonate solution within the first container of the hydrogen generator was supplied to the second container at a rate of 4 ml/hr to a total amount of 4 ml, and a current density of the MEA at an operating voltage of 0.7V was measured. This current density was then converted to a power density to evaluate the performance of the fuel cell. The result is presented in Table 1 and FIG. 4.

Comparative Examples 1 to 3

Hydrogen generators were prepared using the same method as Example 1, except that solutions shown in Table 1 were added to the first container, and the performances thereof were evaluated. The current density of each MEA at an operating voltage of 0.7V was measured, and was then converted to power density to evaluate the performance of the fuel cell. The results are presented in Table 1 and FIG. 4.

TABLE 1

|  | Solution | Performance (power density, mW/$cm^2$) |
|---|---|---|
| Example 1 | sodium bicarbonate (10 wt %) | 120 |
| Comparative Example 1 | sulfuric acid (3 wt %) | 103 |
| Comparative Example 2 | acetic acid (4 wt %) | 103 |
| Comparative Example 3 | maleic acid (25 wt %) | 85 |

Figure 4:
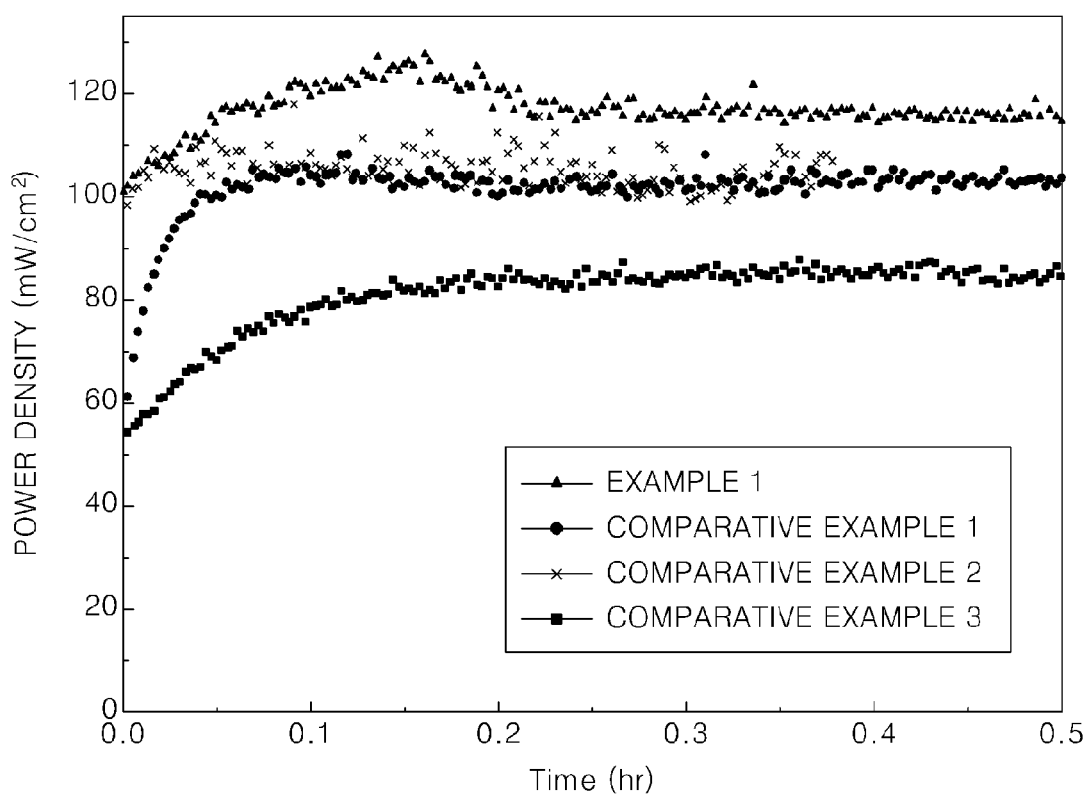
FIG. 4 is a graph illustrating power densities of fuel cells of Example 1 and Comparative Examples 1 to 4, with respect to operation time.

Referring to Table 1 and FIG. 4, in the case where the hydrogen generator of Example 1 was used, the fuel cell exhibited a superior power density compared to the case where the hydrogen generators of Comparative Examples 1 to 3 were used. This is considered to be due to the hydrogen generator according to aspects of the present invention using alkaline metal bicarbonate that provides a higher hydrogen generating rate, in comparison to hydrogen generators using acidic solutions.

In various aspects, at least one of or at least one selected from refers to alternatives chosen from available elements so as to include one or more of the elements. For example, if the elements available include elements X, Y, and Z, at least one of or at least one selected from refers to X, Y, Z, or any combination thereof.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A hydrogen generator to generate hydrogen gas, the hydrogen generator comprising:
   a first container containing an aqueous solution of an alkaline metal carbonate or bicarbonate;
   a second container containing a metal hydride, wherein the metal hydride is in a solid state; and
   a supply unit disposed between the first container and the second container to supply the aqueous solution of the alkaline metal carbonate or bicarbonate to the metal hydride or vice versa.

2. The hydrogen generator of claim 1, wherein the alkaline metal carbonate or bicarbonate is at least one selected from the group consisting of sodium carbonate, potassium carbonate, sodium bicarbonate, and potassium bicarbonate.

3. The hydrogen generator of claim 1, wherein a content of the alkaline metal carbonate or bicarbonate is more than 0 wt % and up to 30 wt % based on a weight of the aqueous solution.

4. The hydrogen generator of claim 1, wherein the metal hydride is at least one selected from the group consisting of an alkaline metal boron hydride, an alkaline metal aluminum hydride, an alkaline metal hydride, and an alkaline earth metal hydride.

5. The hydrogen generator of claim 1, wherein the metal hydride is sodium boron hydride.

6. The hydrogen generator of claim 1, wherein the aqueous solution of the first container further includes at least one acid selected from the group consisting of sulfuric acid, nitric acid, hydrochloric acid, acetic acid, citric acid, and maleic acid.

7. The hydrogen generator of claim 1, further comprising a third container containing an aqueous solution of at least one acid selected from the group consisting of sulfuric acid, nitric acid, hydrochloric acid, acetic acid, citric acid, and maleic acid.

8. The hydrogen generator of claim 1, wherein the supply unit supplies the aqueous solution of the first container to the second container at a controlled rate.

9. The hydrogen generator of claim 1, wherein the supply unit supplies the metal hydride of the second container to the first container at a controlled rate.

10. A fuel cell including the hydrogen generator according to claim 1.

11. A method of generating hydrogen gas using hydrogen generator for use in a fuel cell, the method comprising:
supplying an aqueous solution of an alkaline metal carbonate or bicarbonate via a first container of the hydrogen generator;
supplying a metal hydride via a second container of the hydrogen generator, wherein the metal hydride is in a solid state; and
combining the aqueous solution of the alkaline metal carbonate or bicarbonate and the metal hydride to produce the hydrogen gas via a supply unit of the hydrogen generator.

12. The method of claim 11, wherein the alkaline metal carbonate or bicarbonate is at least one selected from sodium carbonate, potassium carbonate, sodium bicarbonate, and potassium bicarbonate.

13. The method of claim 11, wherein a content of the alkaline metal carbonate or bicarbonate is more than 0 wt % and up to 30 wt % based on a weight of the aqueous solution.

14. The method of claim 11, wherein the metal hydride is at least one selected from an alkaline metal boron hydride, an alkaline metal aluminum hydride, an alkaline metal hydride, and an alkaline earth metal hydride.

15. The method of claim 11, wherein the metal hydride is sodium boron hydride.

16. The method of claim 11, wherein the aqueous solution of the first container further includes at least one acid selected from sulfuric acid, nitric acid, hydrochloric acid, acetic acid, citric acid, and maleic acid.

* * * * *